INVENTORS.
ALFONS ALVEN.
DAVID R. GRIGSON.
BY John R. Varney.
ATTORNEY.

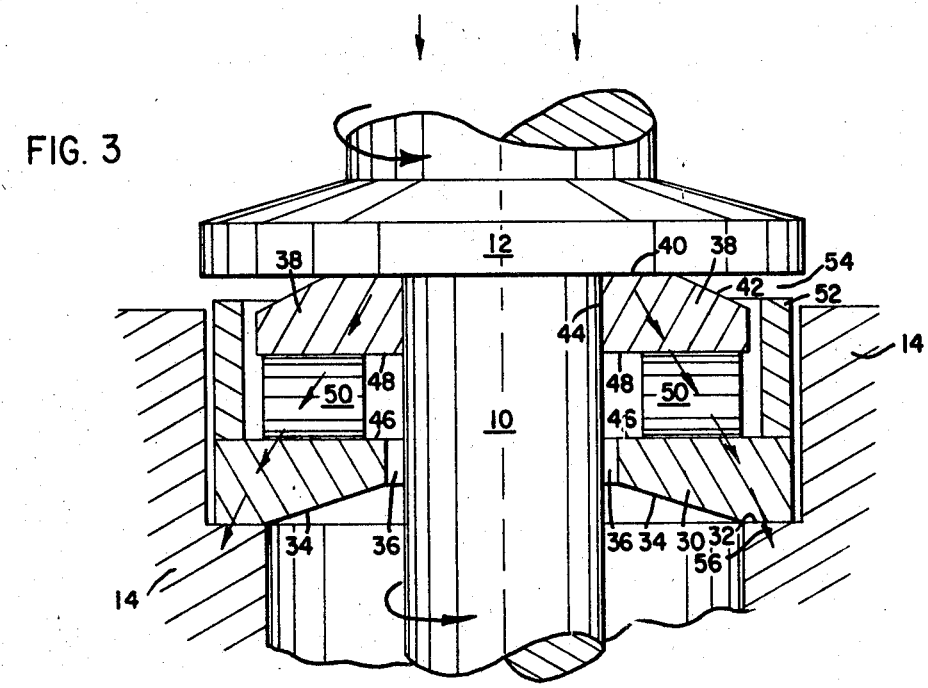
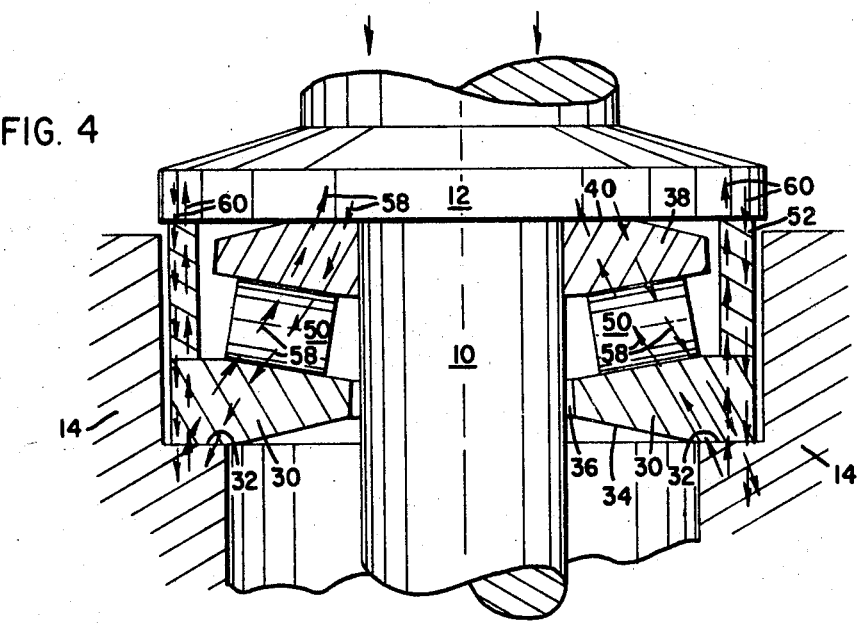

United States Patent Office 3,393,022
Patented July 16, 1968

3,393,022
CANTILEVER THRUST BEARING
Alfons Alven, Dallas, Tex., and David R. Grigson, Syracuse, N.Y., assignors to Rollway Bearing Company, Inc., Syracuse, N.Y., a corporation of New York
Filed June 25, 1965, Ser. No. 466,935
1 Claim. (Cl. 308—35)

This invention relates to and has as a general object a new and improved cantilever thrust bearing.

In certain instances thrust bearings are required for transmitting thrust loads from a rotating member such as a shaft to a fixed member such as a housing where shock and static thrust loads are greatly in excess of the rotational loads, as for example from four to five times the rotational loads. In such instances the space and weight requirements of the bearing are critical so that it is necessary that the thrust bearing be of the smallest size possible to carry the rotational thrust load but at the same time have sufficient capacity to transmit the high static and shock loads without overloading and destroying the bearing.

An initial approach to these design requirements was to use a standard thrust bearing of the type which will be more completely described hereinafter by referring to the drawings. In such a standard bearing a heavy steel ring is carried between the upper and lower plates and the height of this ring is less than the combined height of the plates and the roller assembly so that there is a gap between the upper plate and the top of the steel ring. This gap was determined by the calculated elastic compression between the rollers and the plates that would take place when a static or shock load was applied to the bearing. When this load exceeded a pre-determined amount the plates and rollers would be compressed and the ring would "bottom" upon the underside of the top plate and divide the load transmitted through the bearing so as to take any increased load through the ring rather than through the roller assembly. Such a solution has been rejected, however, because of the impraticability of design for mass production under normal manufacturing tolerances.

For example, for a rotational load of from fifty thousand (50,000) to eighty thousand (80,000) pounds and a static load of from two hundred thousand (200,000) to three hundred twenty thousand (320,000) the rate of deformation for a conventional bearing of the size required is only three one hundred thousandths (.00003) per one thousand (1000) pound load. Taking a load from fifty to eighty thousand (50,000 to 80,000) pounds with this rate of deformation the gap between the ring and the underside of the top plate amounts to some fifteen thousandths (.0015) to twenty four thousandths (.0024) of an inch. The net difference of nine ten thousandths (.0009) must be maintained including manufacturing tolerances on the roller diameter, both plate thicknesses, and the ring height. As will be obvious such an arrangement is impractical from a manufacturing standpoint.

Applicants' invention has solved these problems by use of a cantilever thrust bearing as will be more completely described by reference to the drawings hereinafter. With the bearing of applicants' invention for the same loads of from fifty to eighty thousand (50,000 to 80,000) pounds the rate of deflection of the new bearing which is the subject of this invention is sixteen hundred thousandths (.00016) inch per one thousand pound load resulting in a gap between the top of the ring and the underside of the top plate of some eighty thousandths to one hundred twenty three thousandths (.0080 to .0123) of an inch. Accordingly, such range is practical when considering with normal manufacturing tolerances on the roller diameter, thrust plate thicknesses, and ring height. In addition, the thrust load required to close the gap between the ring and the upper thrust plate is more clearly defined and will vary only slightly with the variation in the gap clearance.

As will be understood, the new and improved bearing constituting the subject of this application will have numerous uses where extremely high static or shock loads occur but where the rotational loads are substantially lower than such static or shock loads.

Further, the bearing comprising the subject of this invention may be manufactured of a smaller physical size than is normally required, resulting in weight reduction and cost savings. Finally, the bearing comprising the subject of this invention will eliminate damage to the bearing under high shock loads because the ring gap is so designed to cause "bottoming" of the ring well before the point of excessive deformation of the rollers and thrust plates.

Accordingly, it is a more specific object of this invention to provide a new and improved cantilever thrust bearing of the type which will transmit high static or shock loads but yet is of a size and weight intended for transmitting substantially lower rotational loads thereby reducing the cost of manufacture.

The invention consists in the novel features and constructions and the method hereafter set forth and claimed.

In describing the invention reference is had to the accompanying drawings in which like characters designate corresponding parts in all the views.

In the drawings—

FIGURE 3 is a schematic cross sectional view of the bearing comprising the preferred embodiment of the invention under normal rotational load and FIGURE 4 is a view similar to FIGURE 3 showing the bearing under high shock or static load.

Figure 1:
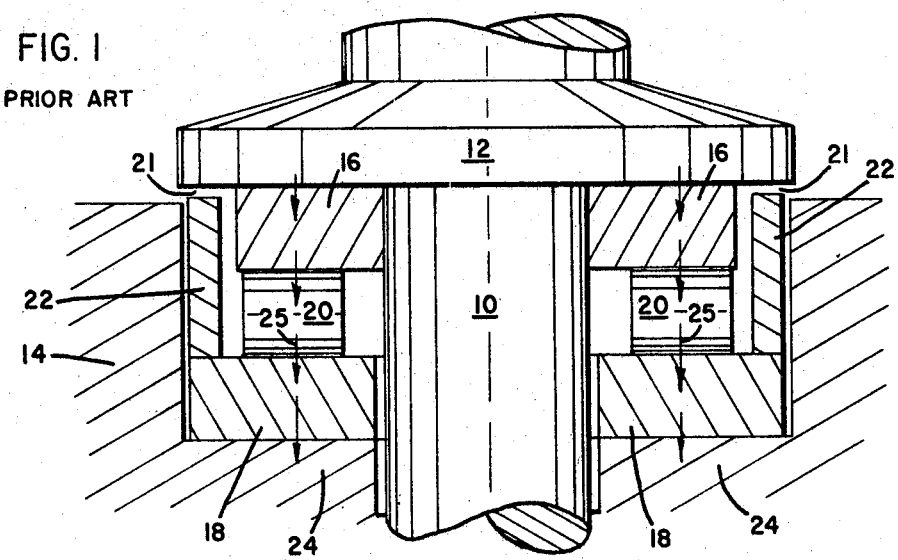
FIGURE 1 is a schematic bearing cross sectional view of a conventional thrust bearing under normal rotational load.

In FIGURE 1 a rotating thrust member comprising a shaft 10 having a flange 12 is partially shown mounted in a portion of a fixed member such as a housing 14.

Figure 2:
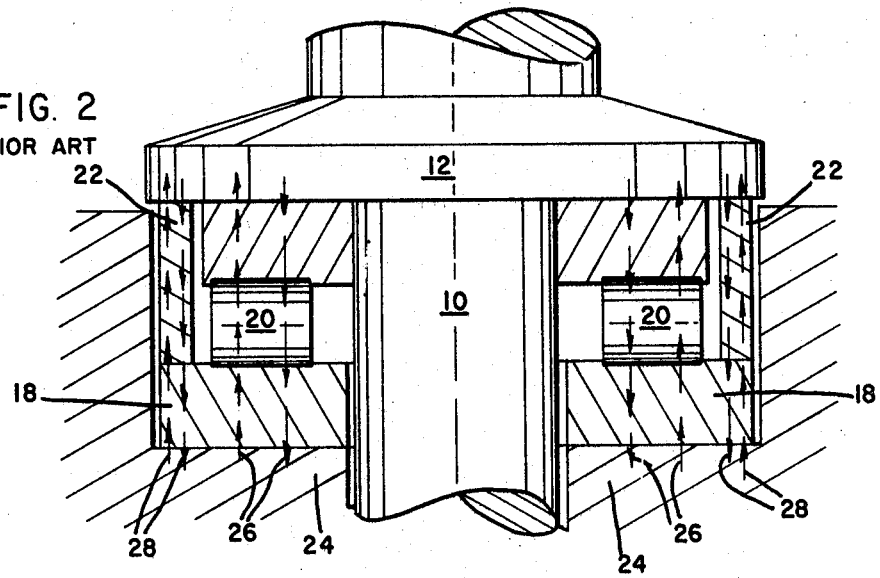
FIGURE 2 is a view similar to FIGURE 1 showing the bearing under high static or shock load.

The conventional thrust bearing shown in FIGURES 1 and 2 comprises an upper rotating plate 16, a lower stationary plate 18, an anti-friction member 20 and a steel ring 22 is received in the area between the flange 12 and the housing seat 24.

It will be understood that a plurality of anti-friction members 20 which in this instance are shown to be rollers are carried between the plates 16 and 18.

The arrows 25 shown on FIGURE 1 illustrate the force path by which the load on the shaft 10 is transmitted to the housing 14, this load being a relatively low rotational load.

In FIGURE 2 the same bearing is shown under a high static or shock load of the magnitude of four or five times the rotational load. This results in compression of the member 20 and the members 16 and 18, at the area of contact of these members with the members 20 as is indicated by the heavy dark lines. The gap 21 between the ring 22 and the under surface of the flange 12 is shown as being completely closed by the load and it will be understood that the amount of compression of the plates and rollers at the line of contact at the top and bottom of the roller will be one-half the amount of the total initial gap.

Again in FIGURE 2 the arrows indicate the force paths by which the load applied to the thrust bearing is transmitted through the bearing. As will be seen the group of arrows indicated at 26 comprises one force path while the group of arrows indicated at 28 comprises a second force path so that the total load applied to the bearing is divided between these two force paths.

The bearing shown in FIGURES 1 and 2 is the conventional bearing described in the preamble and illustrates the example therein given showing the impracticability of construction and manufacture of this type of bearing to take the load variations set forth in the example.

Referring now to FIGURES 3 and 4 the new and improved cantilever thrust bearing comprising the subject of this application is shown in the space between the shaft 10 with the flange 12 and the housing 14.

This bearing comprises a lower plate 30 having a portion of its under surface 32 flat so as to engage the seat 14 and the remainder of its under surface 34 sloping upwardly and inwardly toward the axis of the bearing. It will be noted that the aperture 36 of the bearing is over sized so as to permit the shaft 10 to freely rotate therein.

The upper plate 38 of the bearing likewise has a portion 40 of its upper surface in contact with the shaft flange 12 and the remainder 42 of the surface slopes downwardly and outwardly from the axis of the bearing complementally to and parallel with the surface 34 on the lower plate. The aperture 44 in this plate is sized so as to cause the plate to rotate with the shaft 10. Carried between the surface 46 on the lower plate and the surface 48 on the upper plate are a plurality of anti-friction members shown in this instance to be rollers 50. It will be understood that the showing is schematic and the rollers are normally carried by a roller retainer assembly or cage.

Carried on the upper surface of the lower plate 30, in any suitable fashion, is an annular steel ring 52 which has an axial length such that a gap 54 is provided between the upper end of the ring 52 and the under side of the flange 12.

It will be understood that in all the figures of the drawings the gaps and deflection of the various bearings are shown in a greatly exaggerated condition in order to more clearly illustrate the invention.

As shown in FIGURE 3 the bearing is in rotation under the normal relatively low rotational load and the arrows 56 illustrate the force path by which the load is transmitted through the bearing.

When, however, the high static or shock load is applied to the bearings as shown in FIGURE 4, the plates 30 and 38 deflect in a manner whereby the axes of the rollers 50 are changed from a position normal to the axis of the shaft 10 and the bearing to the position shown in FIGURE 4. This deflection, half of which takes place on each side of the rollers where they enter into line contact with the plates 30 and 38, is sufficient to close the gap 54 and bottom the ring 52 on the underside of the flange 12 so as to divide the force path from that shown in FIGURE 3 to a first force path shown by arrows 58 which is through the plates 30 and 38 and rollers 50 and a second force path shown by arrows 60 which is through the lower plate 30 and ring 52 to the flange 12.

By way of example, the conventional bearing shown in FIGURES 1 and 2 has an outside diameter of 7" and bore of 4" so that for an applied load, sixty thousand (60,000) pounds the clearance of gap between the ring and the shaft flange is two thousandths (.002) of an inch. Accordingly, the applied thrust load required to cause bottoming of the ring must be divided within a very narrow range and the rate of deflection is extremely small being three hundred thousandths (.00003) of an inch per one thousand (1000) pounds of applied load. As will be understood, it would be necessary under these conditions to control the roller diameters, plate thicknesses, and ring length to tolerances which are impossible to maintain in normal manufacturing operations.

However, with the cantilever bearing shown in FIGURES 3 and 4 which comprises the subject matter of this invention the rate of deflection is now sixteen ten thousandths (.00016) of an inch per one thousand (1000) pounds of applied load and the gap between the ring and the shaft flange is several times that of the bearing shown in the FIGURES 1 and 2 for the same applied thrust load and bearing size. In the example set forth previously of a thrust load of sixty thousand (60,000) pounds and a bearing having a 4" bore and a 7" outside diameter, the gap is six times as great in the cantilever bearing.

Accordingly, the control over plate thicknesses, roller diameter, and axial length of the ring is less critical and the parts may be manufactured under normal machining tolerances. Further, the applied thrust load required to effect bottoming of the ring on the shaft flange is more clearly defined and will vary only slightly with the variations in the gap between the ring and the shaft flange.

Most important, however, is the fact that the bearing may be manufactured substantially smaller thus resulting in savings in cost and weight by yet at the same time providing a bearing that will transmit static loads four to five times.

What we claim is:

1. A cantilever thrust bearing transmitting a thrust load from a flanged rotating member to a fixed member wherein said rotating member has a high static load and a reduced rotational load, comprising, a lower plate having a seating surface, a portion of which slopes upwardly and inwardly toward the axis of the bearing, and an anti-friction member receiving surface, an upper plate having a seating surface engaging said flanged rotating member, a portion of which is complementally and parallel sloping with said lower plate sloped surface, and an anti-friction member receiving surface, a plurality of anti-friction members carried between said plates, rotational thrust loads applied to said bearing being transmitted through said plates and anti-friction members, a ring member carried between said lower plate and flanged rotating member said ring member being normally spaced from said flanged rotating member to provide a gap therebetween, said plates having a predetermined deflection rate under a thrust load applied to said bearing, said plates deflecting under a high static load to close the gap between said ring and said flanged member so as to divide the load transmitted from said rotating member to said fixed member between a first force path through said plates and anti-friction members and a second force path through said ring and said lower plate.

References Cited

UNITED STATES PATENTS

| | | | |
|---|---|---|---|
| 1,853,675 | 4/1932 | English | 308—35 |
| 1,956,648 | 5/1934 | Messinger | 308—231 |
| 2,250,668 | 7/1941 | Hill | 308—231 |
| 2,374,820 | 5/1945 | Kaye | 508—231 |

MARTIN P. SCHWADRON, *Primary Examiner.*

FRANK SUSKO, *Examiner.*